(12) United States Patent
Hallivuori et al.

(10) Patent No.: US 7,343,146 B2
(45) Date of Patent: Mar. 11, 2008

(54) SINGLE CHIP LNA AND VCO HAVING SIMILAR RESONANT CIRCUIT TOPOLOGY AND USING SAME CALIBRATION SIGNAL TO COMPENSATE FOR PROCESS VARIATIONS

(75) Inventors: Juha Hallivuori, Tampere (FI); Mikael Gustafsson, Porvoo (FI)

(73) Assignee: Nokia Corporation, Espoo (FI)

( * ) Notice: Subject to any disclaimer, the term of this patent is extended or adjusted under 35 U.S.C. 154(b) by 322 days.

(21) Appl. No.: 10/917,634

(22) Filed: Aug. 13, 2004

(65) Prior Publication Data

US 2006/0035619 A1 Feb. 16, 2006

(51) Int. Cl.
*H04B 1/28* (2006.01)
*H04B 1/26* (2006.01)

(52) U.S. Cl. .................. 455/333; 455/323; 455/285

(58) Field of Classification Search ........... 455/285, 455/290, 302, 333, 334, 339, 340, 341, 291, 455/326, 310; 433/323
See application file for complete search history.

(56) References Cited

U.S. PATENT DOCUMENTS

| | | | | |
|---|---|---|---|---|
| 5,060,297 A | | 10/1991 | Ma et al. ..................... | 455/302 |
| 5,311,149 A | * | 5/1994 | Wagner et al. .............. | 331/1 A |
| 5,715,531 A | | 2/1998 | Liu et al. ..................... | 455/307 |
| 5,852,772 A | * | 12/1998 | Lampe et al. ............. | 455/226.2 |
| 5,930,686 A | * | 7/1999 | Devlin et al. ................ | 455/84 |
| 6,542,724 B1 | * | 4/2003 | Copeland et al. ........... | 455/302 |
| 6,621,365 B1 | | 9/2003 | Hallivuori et al. .......... | 331/179 |
| 6,622,009 B1 | * | 9/2003 | Tolson ......................... | 455/76 |
| 6,639,474 B2 | | 10/2003 | Asikainen et al. ............ | 331/17 |
| 6,681,103 B1 | * | 1/2004 | Rogers et al. .............. | 455/302 |
| 6,801,097 B2 | * | 10/2004 | Wallace ...................... | 331/179 |
| 7,095,043 B2 | * | 8/2006 | Oda et al. ..................... | 257/19 |
| 2003/0176174 A1 | | 9/2003 | Seppinen et al. ........ | 455/226.1 |
| 2003/0199259 A1 | | 10/2003 | Macedo et al. ............. | 455/141 |
| 2003/0203742 A1 | | 10/2003 | D'Souza et al. ............ | 455/522 |
| 2004/0219893 A1 | * | 11/2004 | Takano et al. ........... | 455/114.3 |
| 2006/0121871 A1 | * | 6/2006 | Kim ........................... | 455/313 |

FOREIGN PATENT DOCUMENTS

EP          1006-669          6/2000

* cited by examiner

*Primary Examiner*—Sonny Trinh
(74) *Attorney, Agent, or Firm*—Harrington & Smith, PC (57) ABSTRACT

In one aspect this invention provides a radio frequency receiver for coupling to an antenna. The receiver includes a downconversion mixer, an amplifier having an input coupled to the antenna and an output coupled to a first input of the mixer for providing a received frequency signal to the mixer and a voltage controlled oscillator having an output coupled to a second input of the mixer for providing a mixing frequency signal to the mixer. In the preferred embodiments the components of the amplifier and the voltage controlled oscillator are arranged to exhibit a substantially identical resonant circuit topology and are implemented in the same integrated circuit. In the preferred embodiments the amplifier and the voltage controlled oscillator each include calibration circuitry coupled to a calibration signal for compensating for integrated circuit component value variations, and where a calibration signal used for the voltage controlled oscillator is used as well for the amplifier.

35 Claims, 6 Drawing Sheets

| FIG. 3A |
| FIG. 3B |

SINGLE CHIP LNA AND VCO HAVING SIMILAR RESONANT CIRCUIT TOPOLOGY AND USING SAME CALIBRATION SIGNAL TO COMPENSATE FOR PROCESS VARIATIONS

TECHNICAL FIELD

These teachings generally concern radio frequency (RF) receivers and, more specifically, concern single chip RF receiver designs.

BACKGROUND

The following abbreviations are herewith defined:
BB baseband
IC integrated circuit
IF intermediate frequency
LNA low noise amplifier
LO local oscillator
PLL phase lock loop
RF radio frequency
RX receiver
VCO voltage controlled oscillator
VDD power supply voltage Presently, multi-band receivers that are implemented using ICs incorporate receiver front ends that include multiple off-chip filters. These multiple off-chip filters increase the size, complexity, power consumption and the assembly cost of multi-band transceivers and their use is generally undesirable.

It can be appreciated that those skilled in the art would desire a one-chip, multi-band receiver design. Such a one-chip multi-band receiver design would preferably not require multiple off-chip filters, including a particular filter (image rejection filter) that is typically positioned between the LNA and the frequency mixer. As is explained in commonly assigned US 2003/0176174 A1, "Method and Apparatus Providing Calibration Technique for RF Performance Tuning", Pauli Seppinen, Aarno Parssinen, Mikael Gustafsson and Mika Makitalo (incorporated by reference herein in its entirety), the image rejection filter(s) are typically required due to leakage of transmitter power into the receiver input in full duplex systems, having a simultaneous transmission and reception mode (such as 3G CDMA systems).

However, the elimination of the off-chip filter between the LNA and the mixer requires that signal filtering be accomplished by other means. If the signal filtering is not performed, or is performed incorrectly, the mixer output signal will include an undesired signal component in addition to the desired signal component. This undesired signal component can, in a worst-case scenario, totally destroy the reception of the desired signal component(s).

Further, multi-band requirements for the receiver can alter the front end in such a way that a fixed filter can no longer be implemented between the LNA and mixer. This can occur because, typically, one set of controllable front-end components are used for each frequency band of interest. Thus, those skilled in the art would also desire a front-end design that accommodates multi-band operation without the complexity associated with providing filters for each frequency band.

Figure 1:
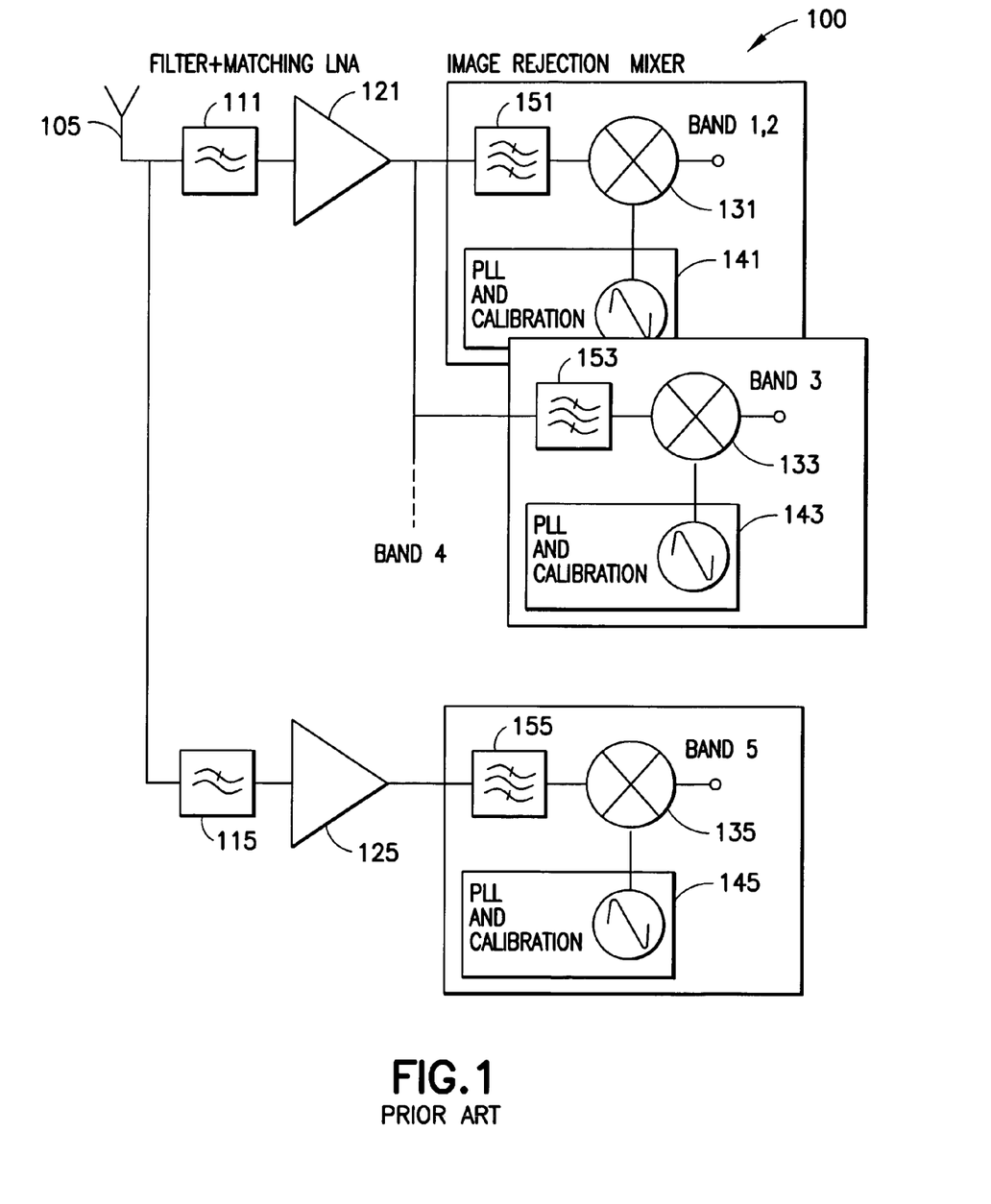
FIG. 1 is a simplified block diagram illustrating an aspect of wireless receiver design made in accordance with the prior art.

More specifically, a portion of a receiver (the receiver "front end") 100 according to the prior art is depicted in FIG. 1. In this particular example the receiver 100 operates in five frequency bands (Band_1 to Band_5). The receiver 100 includes filtering and impedance matching components 111 and 115 (referred to for simplicity as filters) that are connected to a wideband antenna 105. The filters 111 and 115 are in turn respectively connected to LNAs 121 and 125. The outputs of the LNAs 121 and 125 are in turn connected to image rejection filters 151, 153, . . . 155, respectively, and thence to mixers 131, 133, . . . , 135. Using the mixers 131-135 the signals are mixed down (downconverted) to baseband (e.g., zero Hertz, close to zero Hertz, or to any suitable IF when implementing a superheterodyne or equivalent receiver) for further signal processing. VCOs contained in PLL and calibration circuit blocks 141-145 are connected to mixers 131-135, respectively, and provide appropriate mixing frequency signals thereto. As is apparent from FIG. 1, separate calibration circuitry (part of the PLL and calibration blocks 141-145) is required for servicing the five frequency bands of interest. Note that Band_1 and Band_2 are serviced by the same PLL and calibration block 141 in this non-limiting example of the prior art.

The complexity of the prior art receiver design 100 is further increased by the need for off-chip image rejection filters 151-155. The effective circuit duplication, function overlap and need for chip interconnects to accommodate off-chip filtering processes results in a complex and costly receiver implementation.

SUMMARY OF THE PREFERRED EMBODIMENTS

The foregoing and other problems are overcome, and other advantages are realized, in accordance with the presently preferred embodiments of these teachings.

In one aspect this invention provides a radio frequency receiver for coupling to an antenna. The receiver includes a downconversion mixer, an amplifier having an input coupled to the antenna and an output coupled to a first input of the mixer for providing a received frequency signal to the mixer and a voltage controlled oscillator having an output coupled to a second input of the mixer for providing a mixing frequency signal to the mixer. In the preferred embodiments the components of the amplifier and the voltage controlled oscillator are arranged to exhibit a substantially identical resonant circuit topology and are implemented in the same integrated circuit. The resonant circuit preferably includes tunable elements, such as switchable capacitors and tunable varactors, for component process variation compensation and also for multiple frequency band selection, if desired. In the preferred embodiments the amplifier and the voltage controlled oscillator each include calibration circuitry coupled to a calibration signal for compensating for integrated circuit component value variations, and where a calibration signal used for the voltage controlled oscillator is used as well for the amplifier.

In another aspect this invention provides a method to calibrate a radio frequency receiver. The method includes providing a downconversion mixer, an amplifier having an input coupled to an antenna and an output coupled to a first input of the mixer for providing a received frequency signal to the mixer, and a voltage controlled oscillator having an output coupled to a second input of the mixer for providing a mixing frequency signal to the mixer, where at least components of the amplifier and the voltage controlled oscillator are provided so as to be arranged to exhibit a substantially identical resonant circuit topology in the same integrated circuit. The amplifier and the voltage controlled oscillator are each further provided to comprise calibration circuitry for coupling to a calibration signal for compensating for integrated circuit component value variations. The method further includes obtaining a calibration signal for use in calibrating the voltage controlled oscillator for integrated circuit component value variations, and using the obtained calibration signal for also calibrating the amplifier for integrated circuit component value variations.

In a still further aspect this invention provides a mobile station such as, but not limited to, a cellular telephone that includes at least one antenna and a multimode transceiver operable in different radio frequency bands. The multimode transceiver includes a radio frequency transmitter and a radio frequency receiver coupled to the at least one antenna. The receiver includes a downconversion mixer, an amplifier having an input coupled to the antenna and an output coupled to a first input of the mixer for providing a received frequency signal to the mixer and a tunable oscillator having an output coupled to a second input of the mixer for providing a mixing frequency signal to the mixer. The components of the amplifier and the oscillator are arranged to exhibit a substantially identical resonant circuit topology and are implemented in the same integrated circuit.

In the preferred embodiments of the mobile station the amplifier and the oscillator each include calibration circuitry coupled to a calibration signal for compensating for integrated circuit component value variations, where a calibration signal used for the oscillator is used as well for the amplifier.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 2:
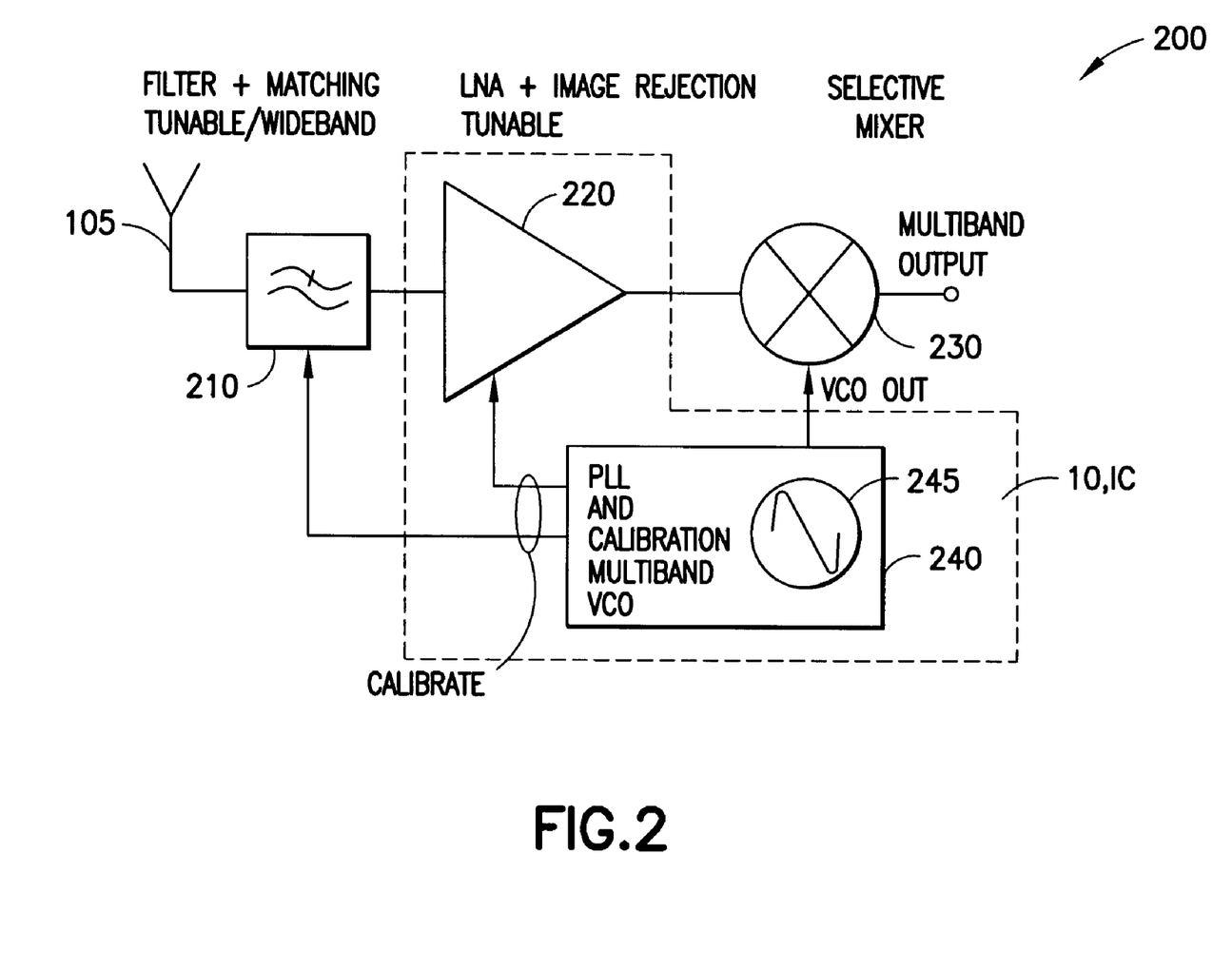
FIG. 2 is a simplified block diagram illustrating an aspect of wireless receiver design made in accordance with a preferred embodiment of the present invention.

A receiver front end 200 constructed in accordance with this invention is depicted in simplified form in FIG. 2. In contrast to the multiple circuits of the prior art receiver front end 100 depicted in FIG. 1, at least LNA 220 and PLL 240/VCO 245 circuit elements are implemented in a common IC (single chip) 10. In addition, in many cases it is also desirable for the mixer 230 to be located on the same chip 10 to ensure adequate gain for the RF signal.

In particular, the output of the off-chip antenna 105 is coupled to a tunable filter 210 that is tunable to the frequency bands of interest. The filter 210 is in turn connected to the input of the LNA 220, and the output of the LNA 220 is in turn connected to the input of a selective mixer 230. Calibration-related outputs of the tunable local oscillator (PLL) 240 are connected to the filter 210 and the LNA 220, and a frequency signal output (VCO_out) is coupled to the mixer 230.

Contrasting FIG. 2 to FIG. 1, it is immediately apparent from FIG. 2 that a feature of this invention is the elimination of multiple redundant circuits that perform the same function for each frequency band of interest. This is accomplished by the implementation of tunable circuit elements in resonant circuits that can be tuned to the desired frequency bands of interest, as well as for use in compensating for component variations. The tuning function is accomplished by associated multiple reactive circuit elements (not depicted in FIG. 2) that are used to tune to the tunable circuit elements to the desired frequency bands.

Since the depicted receiver front end elements 210, 220, 230 and 240 are preferably implemented in a single chip, the circuit components that comprise these individual circuit elements are subject to the same process variations, including the multiple reactive circuit elements used to tune the LNA 220 and the VCO 245. This fact has the desirable effect that the calibration signal developed to calibrate the VCO 245 can likewise be used to calibrate the LNA 220. The availability of a tuning signal for tuning the LNA 220 load and input impedance matching eliminates the need for a separate calibration circuit for the LNA 220. Further, this circuit implementation increases the selectivity of the LNA 220 to such a degree that a separate image signal rejection filter, filters 151-155 depicted in FIG. 1, are rendered unnecessary.

Figure 3:
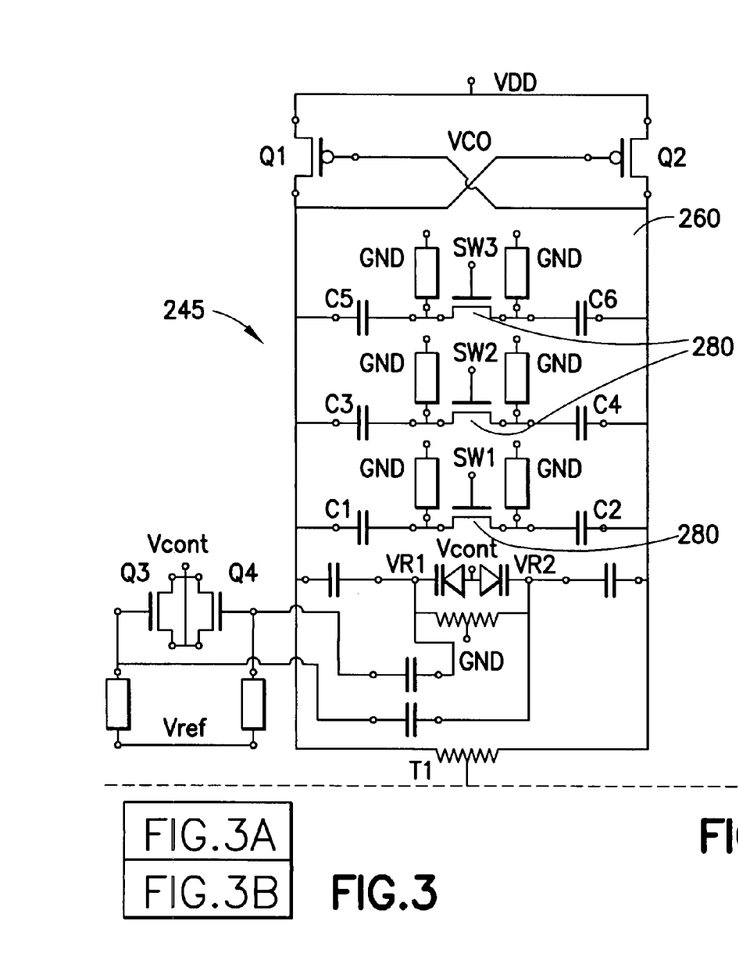
FIG. 3 is a circuit diagram illustrating in greater detail the construction of the LNA, VCO and mixer shown in FIG. 2, and emphasizing the similar resonant circuit topology of the LNA and the VCO.
Figure 3A:
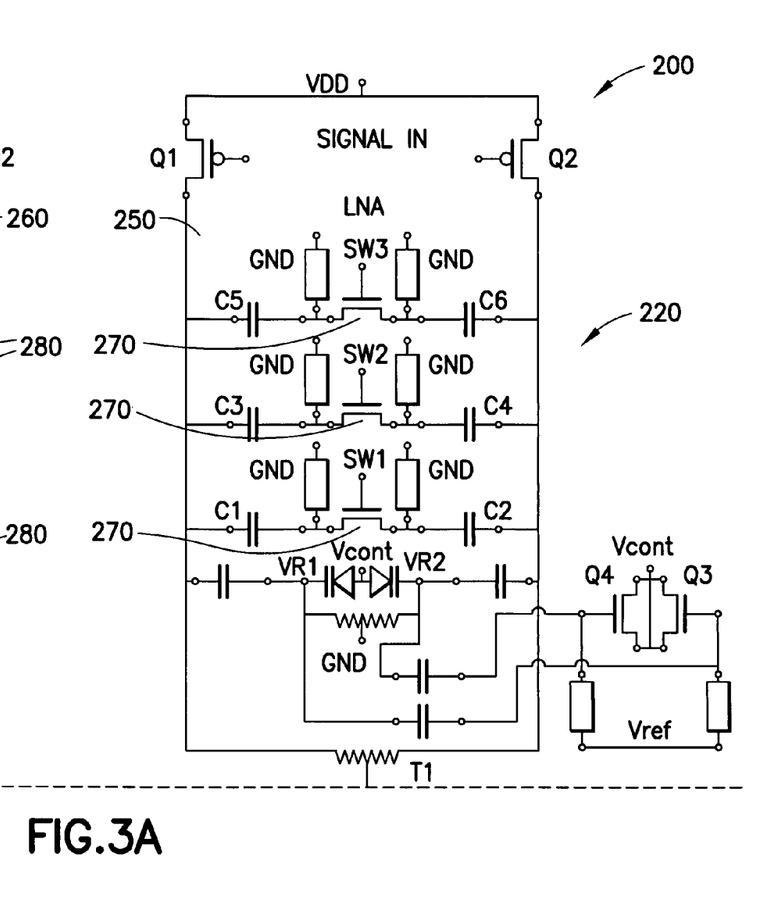
Figure 3B:
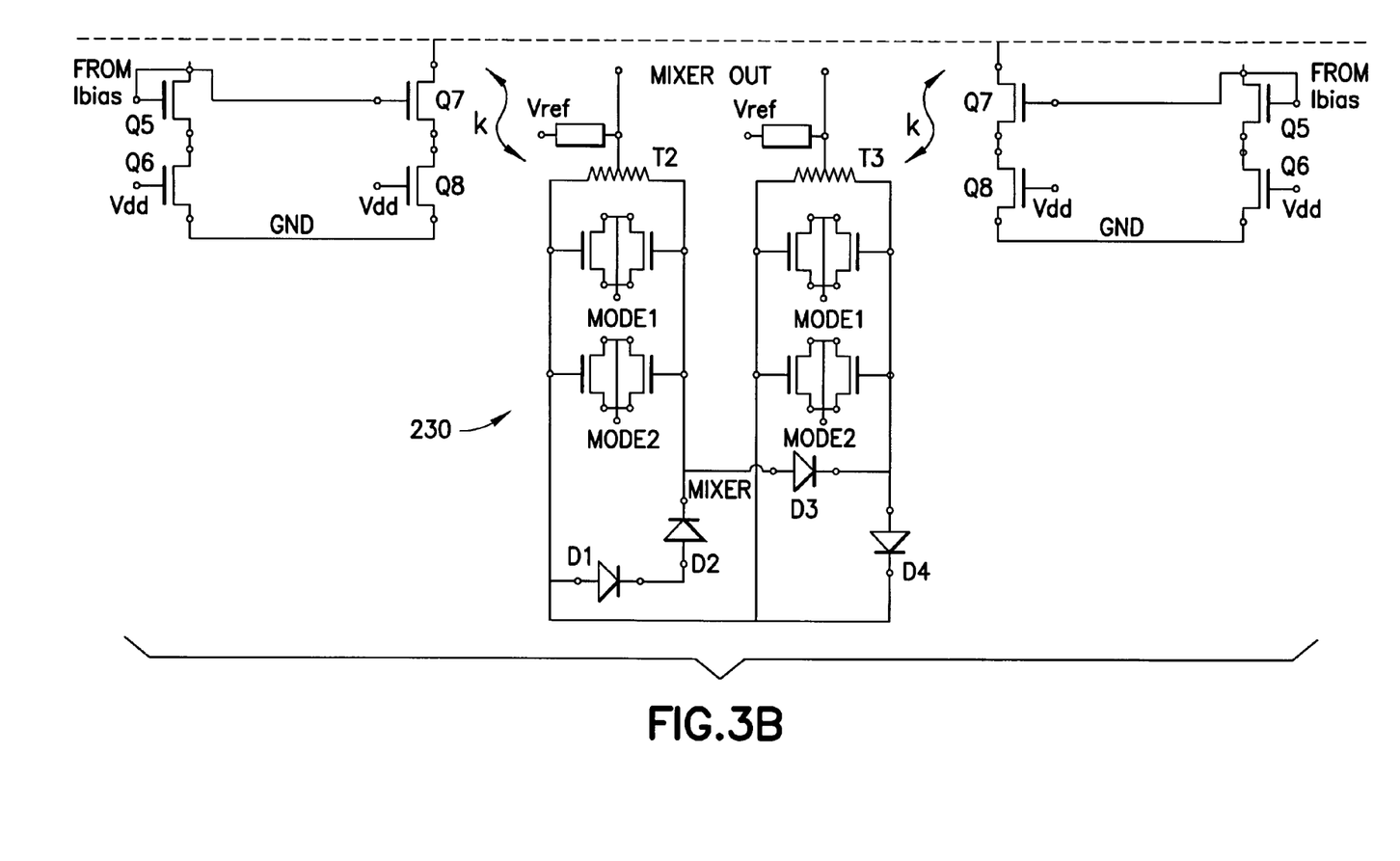

A particular implementation of the receiver front end topology illustrated in FIG. 2 is depicted in FIG. 3. The LNA 220 and VCO 245 are inductively coupled to mixer 230. The LNA 220 and VCO 245 each have associated discrete switched capacitor arrays 250 and 260 that are switched by switches 270 and 280 (capacitors C1-C6 and switches SW1, SW2 and SW3).

A single-chip circuit design that does not rely on external components can require process variation compensation. At frequencies up to several GHz the approximately ±10% variation of capacitance values can cause 300 MHz to 500 MHz variations in the resonance frequency of the VCO 245. To compensate for this variation in operating frequency, a process variation calibration is preferably performed using the capacitors C1-C6 and switches SW1, SW2 and SW3. If the selectivity in the LNA 220 is increased the same type of problem can arise, also requiring calibration to be performed.

Furthermore, multi-band operation requires band selection capability for the VCO 245 and the LNA 220 for which the switchable capacitors can also be used.

A desirable feature of this invention is the similarity in the circuit construction and resonance circuit topology of the LNA 220 and the VCO 245, and their implementation in a single IC. A significant distinction between the construction of the LNA 220 and the VCO 245 is that in the VCO 245 the gates of transistors Q1 and Q2 are cross-connected to provide positive feedback to establish an oscillatory condition, whereas the gates of Q1 and Q2 in the LNA 220 form the (differential) signal input nodes of the LNA 220. In other respects, the circuit construction of the LNA 220 and the VCO 245 are substantially identical, including the connections for the current bias (Ibias), voltage reference (Vref) and voltage control (Vcont) signals, and the voltage-tuned varactor diodes VR1, VR2 and various related transistors Q3-Q8. The component values are also preferably substantially identical (within the limits of the IC process variation and differences in small signal gain).

Figure 4:
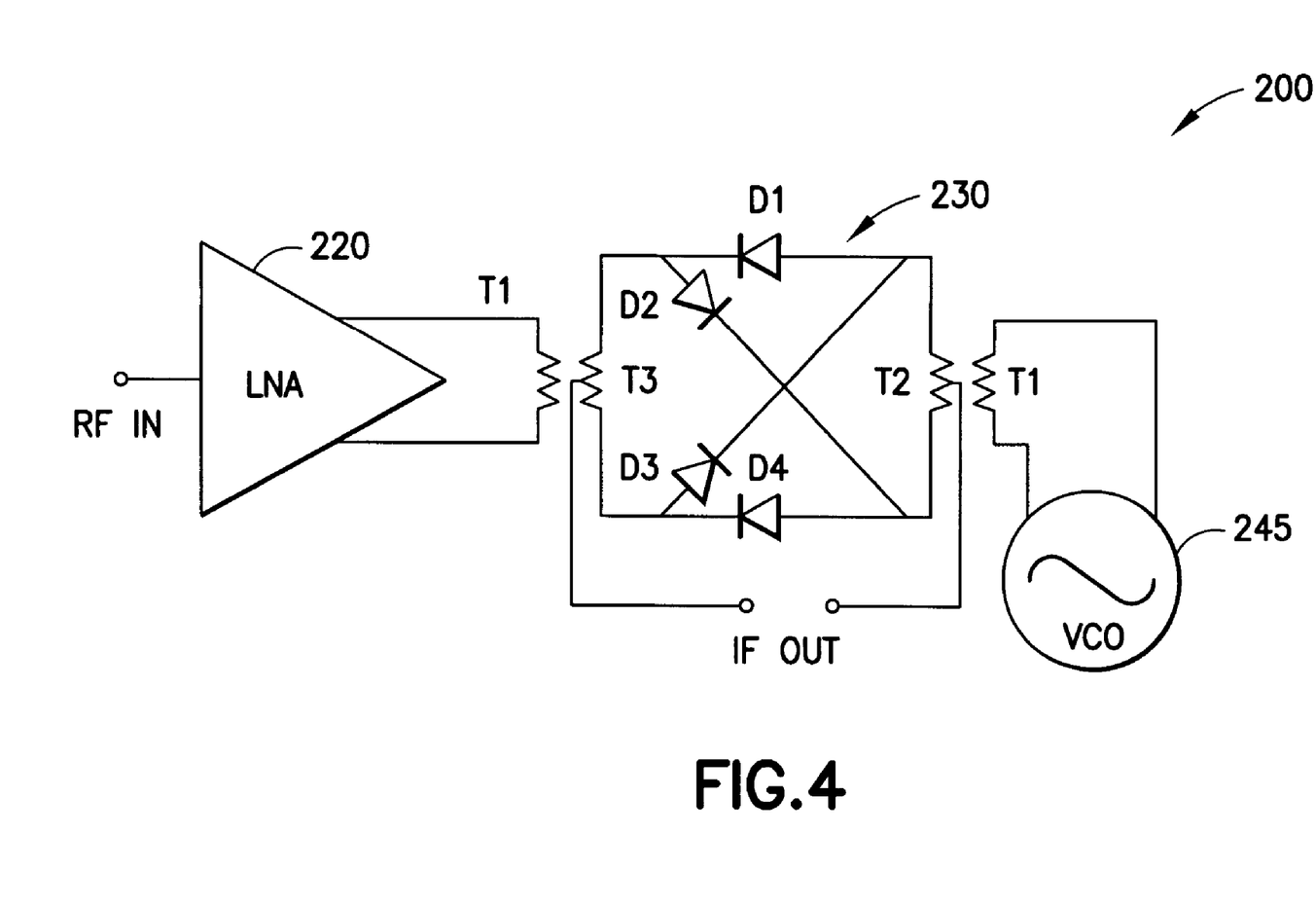
FIG. 4 is a simplified diagram showing the inductive coupling of the mixer, LNA and VCO of FIGS. 2 and 3.

Note further that the output of the LNA 220, and the output of the VCO 245, are both inductively coupled (inductive coupling factor k) via their respective coils T1 to the mixer 230 diode bridge (D1-D4) via mixer coils T2, T3. A simplified diagram of this coupling is shown in FIG. 4. In general, the mixer connections and operational frequency mode selection can be as described in commonly assigned U.S. Pat. No. 6,621,365 B1, "Method and Apparatus Providing a Dual Mode VCO for an Adaptive Receiver", Juha Hallivuori and Pauli Seppinen (incorporated by reference herein in its entirety).

Due to the fact the LNA 220 and the VCO 245 have a substantially identical resonant circuit topology, and are subject to the same process variations by being fabricated in the same IC, it has advantageously been found that the process variation calibration signal determined for the VCO 245 can be used as well to calibrate the LNA 220. This calibration signal can be determined in various ways. One suitable and preferred technique is described by Kalle Asikainen and Pauli Seppinen in commonly assigned U.S. Pat. No. 6,639,474, entitled "Adjustable Oscillator", incorporated by reference herein in its entirety. For example, in this approach an adjustable oscillator has at least one resonant circuit and the frequency of the oscillator is adjusted by changing the resonant frequency of the at least one resonant circuit by means of a control signal. With regard to the control signal, a minimum value and a maximum value are selected, as is at least one target value. The frequency of the adjustable oscillator is set to substantially correspond to the target value. The value of the control signal and the target value are compared, and when the value of the control signal is substantially different from the target value, a tuning signal is produced to change the resonant frequency of the at least one resonance circuit.

As should be apparent, the VCO 245 can be calibrated when the LNA 220 is still uncalibrated, as the preferred (but non-limiting) approach does not require an RF input signal.

In general, the calibration signal can control SW1-SW3 for selecting C1-C6 for both calibration and band selection. Suitable component values for the capacitors and inductors are a function of the actual application. However, it can be noted in this regard that integrated circuit 10 coil values, assuming a good Q value, are approximately in the range of about 0.5 nH to about 6 nH, and the resonant frequency ($f_0$) is defined as the reciprocal of two pi times the square root of the inductance (L) multiplied by the capacitance (C).

If the value of L is fixed, then the variation in frequency arises from the achievable variation of the value of C. Thus, component values for L and C can be quite restricted. If the value of L is variable or tunable, as in the above-referenced commonly assigned U.S. Pat. No. 6,621,365 B1, "Method and Apparatus Providing a Dual Mode VCO for an Adaptive Receiver", Juha Hallivuori and Pauli Seppinen, it becomes possible to provide more frequency bands over a wider frequency range with one receiver front end.

Figure 5:
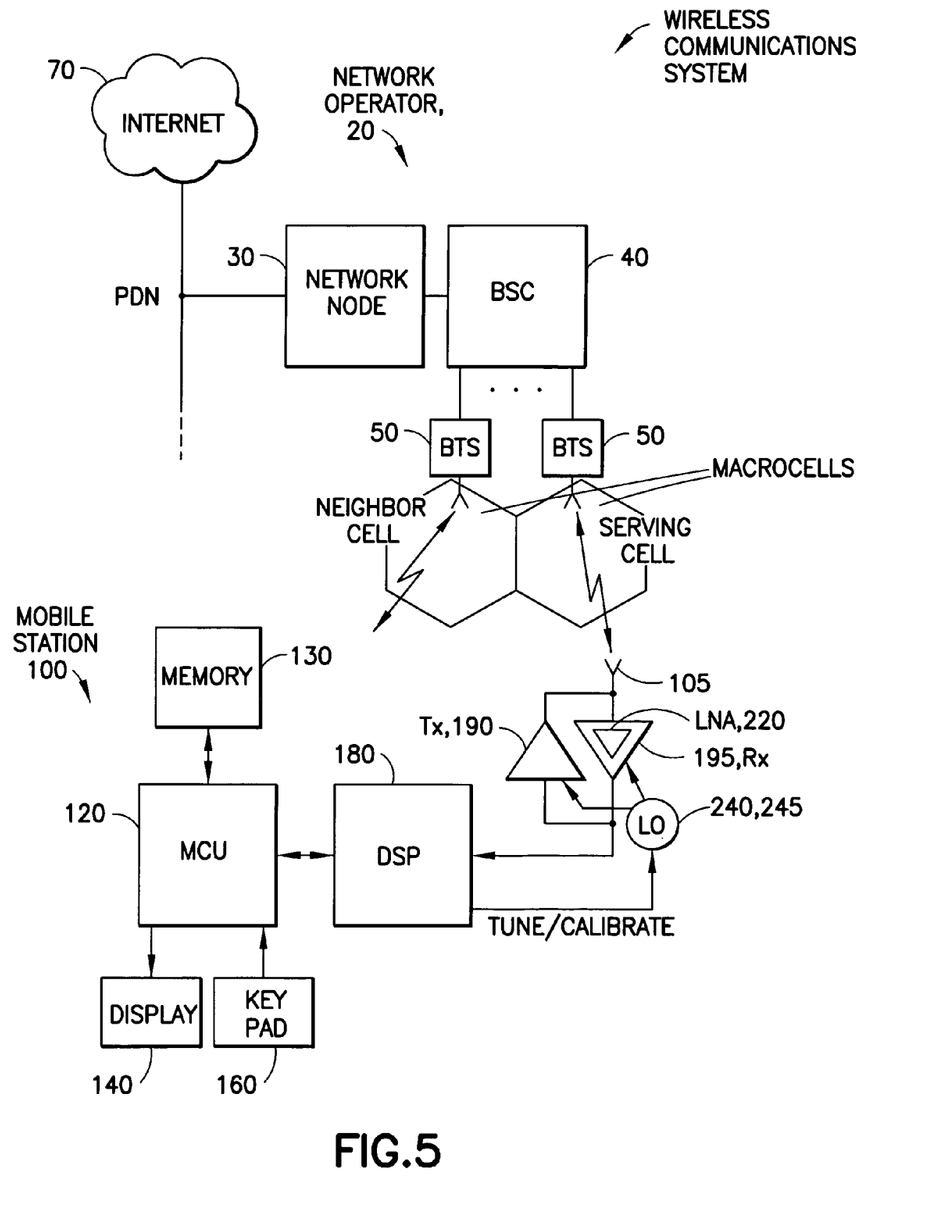
FIG. 5 is a block diagram of a wireless communications system that includes a mobile station having an RF front end constructed and operated in accordance with this invention.

In order to place this invention into a suitable technological context, reference is made to FIG. 5 where there is illustrated a simplified block diagram of an embodiment of a wireless communications system that includes at least one mobile terminal or mobile station (MS) 100 that is suitable for practicing this invention. An exemplary network operator is also shown having, for example, a network node 30 for connecting to a data communications network, such as a Packet Data Network or PDN, at least one base station controller (BSC) 40, and a plurality of base receiver stations (BTS) 50 that transmit in a forward or downlink direction both physical and logical channels to the mobile station 100 in accordance with a predetermined air interface standard. Each BTS 50 is assumed to support a cell. A reverse or uplink communication path also exists from the mobile station 100 to the network operator, which conveys mobile originated access requests and traffic.

The air interface standard can conform to any suitable standard or protocol, and may enable both voice and data traffic, such as data traffic enabling Internet 70 access and web page downloads. One suitable type of air interface is based on TDMA and may support a GSM or an advanced GSM protocol, although these teachings are not intended to be limited to TDMA or to GSM or GSM-related wireless systems. In fact, another wireless system and air interface, such as a WCDMA system, may serve at least a part of the geographical area served by the wireless communication system shown in FIG. 5, and the MS 100 is then in a preferred embodiment a multi-band terminal that is capable of operating with either the GSM or the WCDMA network. Alternatively, it may a single-band terminal that operates only with the WCDMA system.

The mobile station 100 typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user. The MS 100 could also embody, as non-limiting examples, a PDA, or a gaming device, or an Internet appliance having wireless communications capabilities.

The MCU 120 is assumed to include or be coupled to some type of a memory 130, including a read-only memory (ROM) for storing an operating program, as well as a random access memory (RAM) for temporarily storing required data, scratchpad memory, received data, data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to operate in the wireless communications system, as well as to provide a suitable user interface (UI), via display 140 and keypad 160, with a user. The stored program also is operable for executing a suitable joint calibration procedure for the LNA 220 and the VCO 245. Although not shown, a microphone and speaker can be provided for enabling the user to conduct voice calls in a conventional manner.

The mobile station 100 also contains a wireless section that includes a digital signal processor (DSP) 180, or equivalent high speed processor or logic or control unit, as well as a wireless transceiver that includes a transmitter (Tx) 190 and a receiver (Rx) 195 (that contains the LNA 220), both of which are coupled to the antenna 105 for communication with the network operator via the BTS 50. At least one local oscillator (LO), that includes the PLL 240 having the VCO 245, is provided for tuning the transceiver. Data, such as digitized voice and packet data, is transmitted and received through the antenna 105.

While this invention may be used in the 1.9 GHz and 2.1 GHZ WCDMA and the 900/1800 MHz GSM bands, the teachings of this invention are not restricted for use in any particular frequency band or bands. This invention is also not restricted to use in any specific type of wireless architecture, and could be used in, for example, architectures that feature direct conversion receivers as well as superheterodyne receivers.

In the presently preferred mobile station 100 embodiment of this invention the receiver 195 is tunable and operates over a plurality of frequency bands of interest, where a frequency band of interest may include a CDMA frequency band or a TDMA frequency band. More generally, the frequency band of interest may include any preferred frequency band including, but not limited to, the GSM, WCDMA, UWB (e.g., 3.1 Ghz and 4.8 GHz), WLAN (e.g., 2.4 GHz and 5 GHz), Bluetooth (2.4 GHz), DVB-H (e.g., UHF, 470-838 MHz), GPS, FM and RF-ID (e.g., 868 MHz) frequency bands.

Based on the foregoing it can be appreciated that embodiments of this invention concern a receiver design implemented on a single chip and that can include a tunable, wideband filter coupled to a receiver antenna. The tunable wideband filter is in turn coupled to the LNA 220, and the output of the LNA 220 is coupled to the frequency selective mixer 230. Frequency selectivity is achieved by changing the LNA 220 and VCO 245 loads, thus changing the mixer 230 input resonances. A PLL 240 includes a multiband voltage controlled oscillator 245 that is coupled to the mixer 230. Since the VCO 245 and LNA 220 have associated resonant circuits implemented in a single chip, they are subject to the same process variations. In the preferred embodiments of the invention the components of the LNA 220 and the VCO 245 are arranged to exhibit a substantially identical resonant circuit topology, and as a result the same integrated circuit calibration signal used to calibrate the VCO 245 can likewise be coupled to the LNA 220 for calibration purposes. One advantageous consequence of this preferred design is that the selectivity of the LNA 220 can be substantially increased, eliminating the need for the separate, off-chip image rejection filter 151 of the prior art.

The present invention overcomes the limitations of the prior art by providing a one-chip receiver design that eliminates the need for multiple off-chip filters and, in particular, an off-chip image rejection filter for rejecting unwanted image signals. In the preferred embodiments the LNA 220 and VCO 245 are fabricated in a single chip over a common semiconductor substrate, and the LNA 220 and VCO 245 have substantially identical resonant circuits that are subject to the same chip fabrication process variations. Since the LNA 220 can be coupled to the VCO 245 for calibration purposes the need for separate LNA calibration circuitry can be avoided.

In the preferred embodiments of this invention the LNA 220 and the VCO 245 each comprise calibration/band selection circuitry that is coupled to a band selection signal for performing band selection in the multi-band receiver front end, and the same band selection signal is preferably used for the VCO 245 and for the LNA 220. In the preferred embodiments of this invention the calibration signal and band selection signal are the same signal, since the calibration is performed for a certain frequency which can be selected according to the band of interest. In this manner the calibration performed for the process variations, and the band selection, can be accomplished at the same time. The calibration/band selection circuitry may comprise a tunable inductor.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent one-chip front end receiver designs may be attempted by those skilled in the art, as may specific circuit architectures that deviate form the one shown in FIG. 3. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. An apparatus for coupling to an antenna, comprising:
    a downconversion mixer;
    an amplifier having an input configured to be coupled to the antenna and an output configured to be coupled to a first input of the mixer for providing a received frequency signal to the mixer; and
    a voltage controlled oscillator having an output configured to be coupled to a second input of the mixer for providing a mixing frequency signal to the mixer, where components of the amplifier and the voltage controlled oscillator are arranged to exhibit a substantially identical resonant circuit topology and are implemented in the same integrated circuit with other components of a front end of the apparatus, where the amplifier and the voltage controlled oscillator each comprises calibration and band selection circuitry configured to be coupled to an input signal for compensating for integrated circuit component value variations, and where the input signal used for the voltage controlled oscillator is also used for the amplifier.

2. A apparatus as in claim 1, where the calibration and band selection circuitry comprises an array of switched capacitances.

3. A apparatus as in claim 1, where the calibration and band selection circuitry comprises a tunable inductance.

4. A apparatus as in claim 1, where the input signal is a band selection signal for performing band selection in a multi-band receiver front end.

5. A apparatus as in claim 1, where the input signal is a common input signal for performing frequency band selection and where a calibration is performed for a certain frequency selected according to a frequency band of interest.

6. A apparatus as in claim 1, where frequency selectivity of the amplifier is established so as to filter unwanted image frequencies from the received frequency signal.

7. A apparatus as in claim 1, where the apparatus is tunable and operates over a plurality of frequency bands of interest under control of the input signal, where the input signal is also used by the calibration and band selection circuitry to simultaneously compensate the apparatus for the integrated circuit component value variations when operating in a selected frequency band of interest.

8. The apparatus as in claim 1, wherein the apparatus is a radio frequency receiver.

9. A method comprising:
    providing a downconversion mixer, an amplifier having an input configured to be coupled to an antenna and an output configured to be coupled to a first input of the mixer for providing a received frequency signal to the mixer and a voltage controlled oscillator having an output configured to be coupled to a second input of the mixer for providing a mixing frequency signal to the mixer, where at least components of the amplifier and the voltage controlled oscillator are provided so as to be arranged to exhibit a substantially identical resonant circuit topology in the same integrated circuit, where the amplifier and the voltage controlled oscillator are each further provided to comprise calibration circuitry for coupling to a calibration signal for compensating for integrated circuit component value variations;

obtaining a calibration signal for use in calibrating the voltage controlled oscillator for integrated circuit component value variations; and using the obtained calibration signal for also calibrating the amplifier for integrated circuit component value variations.

10. A method as in claim 9, further comprising filtering unwanted image frequencies from the received frequency signal using the amplifier, and without providing a separate image rejection filter that is disposed between the output of the amplifier and the first input of the mixer.

11. A method as in claim 9, further comprising tuning the receiver during use to operate over a plurality of frequency bands of interest by using the calibration signal.

12. An apparatus, comprising:
at least one antenna; and
a multi-mode transceiver operable in different radio frequency bands and comprised of a radio frequency transmitter and a radio frequency receiver configured to be coupled to the at least one antenna, the receiver comprising a downconversion mixer, an amplifier having an input configured to be coupled to the antenna and an output configured to be coupled to a first input of the mixer for providing a received frequency signal to the mixer and a tunable oscillator having an output configured to be coupled to a second input of the mixer for providing a mixing frequency signal to the mixer, where components of the amplifier and the oscillator are arranged to exhibit a substantially identical resonant circuit topology and are implemented in the same integrated circuit with other components of a front end of the receiver, where the amplifier and the voltage controlled oscillator each comprises calibration and band selection circuitry configured to be coupled to an input signal for compensating for integrated circuit component value variations, and where the input signal used for the voltage controlled oscillator is used as well for the amplifier.

13. An apparatus as in claim 12, where the calibration and band selection circuitry comprises an array of switched capacitances.

14. An apparatus as in claim 12, where the calibration and band selection circuitry comprises a tunable inductance.

15. An apparatus as in claim 12, where the input signal is a band selection signal for performing band selection in a multi-band receiver front end.

16. An apparatus as in claim 12, where the input signal is a common input signal for performing frequency band selection and where a calibration is performed for a certain frequency selected according to a frequency band of interest.

17. An apparatus as in claim 12, where a frequency selectivity of the amplifier is established so as to filter unwanted image frequencies from the received frequency signal without requiring use of an image rejection filter that would be disposed external to the integrated circuit between the output of the amplifier and the first input of the mixer.

18. An apparatus as in claim 12, where the receiver is tunable and operates over a plurality of frequency bands of interest under control of a band selection signal, where the input signal is also used by the calibration and band selection circuitry to simultaneously compensate the receiver for the integrated circuit component value variations when operating in a selected frequency band of interest.

19. An apparatus as in claim 18, where a frequency band of interest includes a CDMA frequency band.

20. An apparatus as in claim 18, where a frequency band of interest includes a TDMA frequency band.

21. An apparatus as in claim 18, where a frequency band of interest includes at least one of a GSM, WCDMA, UWB, WLAN, Bluetooth, DVB-H, GPS, FM and RF-ID frequency band.

22. The apparatus as in claim 12, wherein the apparatus is a mobile station.

23. A computer program product comprising a computer readable medium including a computer readable program, wherein the computer readable program when executed on the computer causes the computer to calibrate a radio frequency receiver by performing operations comprising:
in the radio frequency receiver that is provided with a downconversion mixer, an amplifier having an input configured to be coupled to an antenna and an output configured to be coupled to a first input of the mixer for providing a received frequency signal to the mixer and a voltage controlled oscillator having an output configured to be coupled to a second input of the mixer for providing a mixing frequency signal to the mixer, where at least components of the amplifier and the voltage controlled oscillator are provided so as to be arranged to exhibit a substantially identical resonant circuit topology in the same integrated circuit, where the amplifier and the voltage controlled oscillator are each further provided to comprise calibration circuitry for coupling to a calibration signal for compensating for integrated circuit component value variations;

obtaining a calibration signal for use in calibrating the voltage controlled oscillator for integrated circuit component value variations; and using the obtained calibration signal for also calibrating the amplifier for integrated circuit component value variations.

24. The computer program product as in claim 23, where the amplifier is used to filter unwanted image frequencies from the received frequency signal without providing a separate image rejection filter that is disposed between the output of the amplifier and the first input of the mixer.

25. The computer program product as in claim 23, further comprising tuning the receiver during use to operate over a plurality of frequency bands of interest by using the calibration signal.

26. An integrated circuit comprising:
an amplifier having an output for coupling to a first input for providing a received frequency signal;
a voltage controlled oscillator having an output for coupling to a second input, where components of the amplifier and the voltage controlled oscillator are arranged to exhibit a substantially identical resonant circuit topology, where the amplifier and the voltage controlled oscillator each comprises calibration and band selection circuitry configured to be coupled to an input signal for compensating for integrated circuit component value variations, and where the input signal used for the voltage controlled oscillator is used as well for the amplifier.

27. An integrated circuit according to claim 26, further comprising a downconversion mixer having the first and second inputs and receiving a mixing frequency signal from the voltage controlled oscillator and the received frequency signal from the amplifier.

28. An integrated circuit according to claim 26, further comprising at least one component of a front end of a receiver.

29. An integrated circuit according to claim 28, wherein the at least one component comprises a filter.

30. An integrated circuit according to claim 26, wherein the amplifier further comprises an input arranged to be coupled to an antenna.

31. An integrated circuit according to claim 26, wherein the amplifier further comprises a radio frequency input.

32. An integrated circuit comprising:
  means for filtering a received signal to provide an output;
  means for amplifying having an input for coupling to the output of the means for filtering and having an output for coupling to a first input for providing an amplified received frequency signal; and
  means for generating a mixing frequency signal having an output for coupling to a second input, where components of the means for amplifying and the means for generating a mixing frequency signal are arranged to exhibit a substantially identical resonant circuit topology, the means for generating a mixing frequency being coupled to at least one of the means for filtering and the means for amplifying, where the means for amplifying and the means for generating a mixing frequency signal each comprises calibration and band selection means configured to be coupled to an input signal for compensating for integrated circuit component value variations, and where the input signal used for the means for generating a mixing frequency is used as well for the means for amplifying.

33. An integrated circuit according to claim 32, further comprising a means for mixing having the first and second inputs and receiving the amplified received frequency signal from the means for amplifying and receiving the mixing frequency signal from the means for generating a mixing frequency signal.

34. An integrated circuit according to claim 32, wherein the means for amplifying further comprises an input arranged to be coupled to an antenna.

35. An integrated circuit according to claim 32, wherein the means for amplifying further comprises a radio frequency input.

* * * * *